Jan. 16, 1940.  J. GRACE  2,187,346
TEMPERATURE WARNING SIGNAL
Filed Dec. 7, 1938
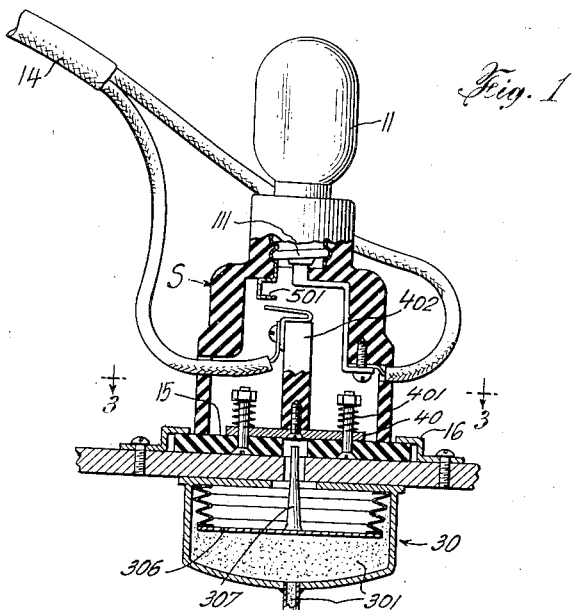
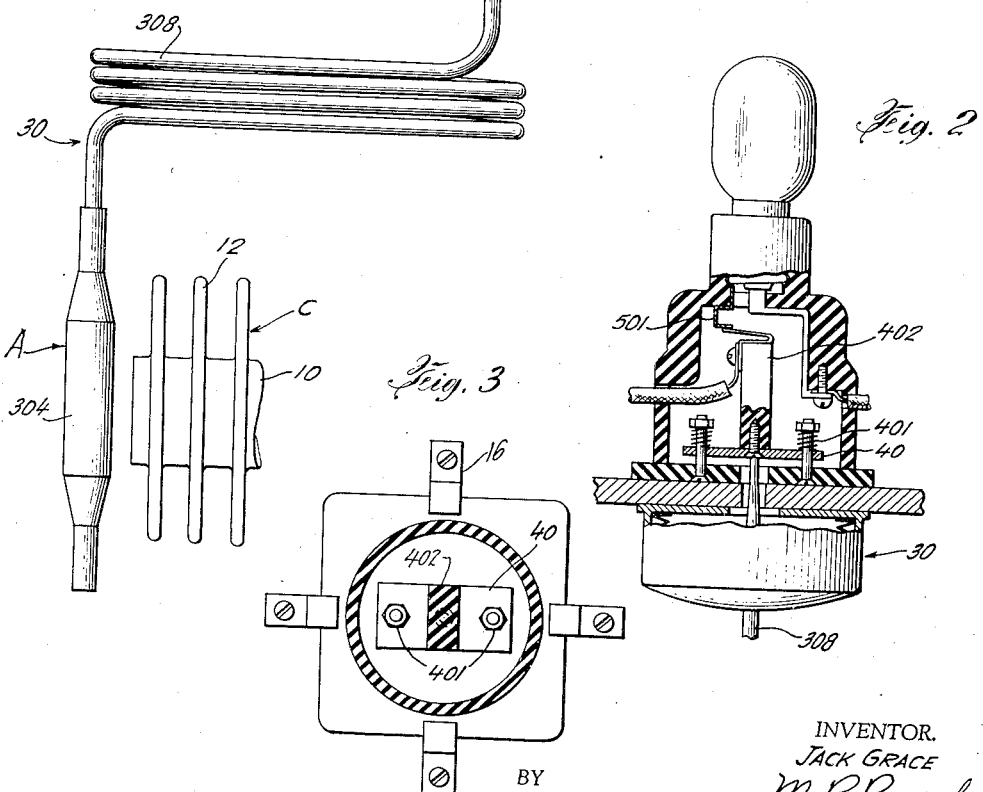
INVENTOR.
JACK GRACE
BY M. P. Parish
ATTORNEY.

Patented Jan. 16, 1940

2,187,346

UNITED STATES PATENT OFFICE 2,187,346

TEMPERATURE WARNING SIGNAL

Jack Grace, Brooklyn, N. Y.

Application December 7, 1938, Serial No. 244,413

3 Claims. (Cl. 200—83)

The principal object of my present invention is to provide a signal which will adjustably indicate a temperature above a desired predetermined temperature in a cooling compartment and to indicate the failure of the cooling mechanism to function from any cause.

Another object is the provision for connection of signal with the circuit of the refrigerator or with the supply line independent of the refrigerator circuit.

Still another object is to provide for automatic operation of the signal which may in addition automatically cut off the refrigerator motor to permit automatic defrosting and on completion thereof automatic starting up of the motor or to provide for merely automatic signaling alone.

A further object is to provide a device of the character described which is economical to construct and easy to install on refrigerators and which may be readily adjusted to varying conditions in various types of refrigerators so that the refrigerator function most efficiently.

These and other objects will be apparent from the following description and drawing.

In the drawing,

Figure 1 is a side elevation of a portion of a refrigerator cooling unit and my automatic signal device (partly in section) for defrosting the cooling unit the contacts for the electric switch for the lamp being shown in normal open position.

Figure 2 is an elevational view of a fragment of the switch mechanism showing the electric contacts in closed position.

Figure 3 is a cross section plan view taken on line 3—3 of Figure 1.

In the drawing, I have used the reference character "C" to indicate generally the cooling unit of a refrigerator mechanism. It may comprise a refrigerant conduit and, heat absorbing fins 12. Motoric means (not shown) are usually connected with the cooling unit. Said unit is usually mounted in a case to cool the air therein to prevent a compartment in which foods especially may be kept from spoiling.

Such a mechanical refrigerator may from any cause fail to function and the cooling unit may accumulate frost, at a rate depending on the moisture content of the air surrounding the unit, which frost may be excessive and detrimental. The unit may at times have to be defrosted. It has been difficult for the ordinary person to determine just when such a failure of mechanism occurs or when to defrost, he being usually too late in discovering the defect or need to defrost, with resulting damage.

When the temperature in the cooling compartment reaches an undesirable point, from any cause, said temperature can be utilized to operate the signal device, generally indicated by "S", to thus automatically signal such condition, as follows.

The device may comprise an actuator (A) mechanism of the temperature responsive type 30, having a bulb 304, mounted in the food compartment or other portion of the refrigerator, automatically responsive to the temperature therein. A diaphragm or the like 306, is connected by a tube 302, with the bulb 304, the unit containing preferably a fluid or gas 301, enclosed therein. Upon an increase of fluid or gas pressure as caused by an increase of temperature in the refrigerator, the diaphragm 306 is moved upwardly and the diaphragm extension 307, contacts and moves switch arm member 40, in opposition to an adjustable spring means 401, to cause the upper end 402, to make contact with 501, to close and energize the signal "S" electric circuit which in turn may be connected with a suitable source of supply as for example the house current or with the electric circuit of the refrigerator.

The indicator 11 is thus caused to light, signalling the need to condition or repair the cooling mechanism or the need to defrost. The device may then be caused to continue as a cooling mechanism.

No invention is claimed in the signal actuating mechanism A. I do claim invention in the combination of such an actuator with means for adjustably utilizing same together with indicating means. For my adjustable electric switch I separately claim invention. In said switch it is seen that by increasing the tension in spring 401, one increases the amount of work that the fluid must do to move the diaphragm 306, and member 307, sufficient to overcome said spring tension. The fluid must expand more and the temperature causing said expansion must now be higher. Said adjustable electric switch is of obvious economical importance, due to varying conditions desired in refrigerators, the matter refrigerated and variances in cooling mechanisms. While I have shown one type of adjustable electric switch other switches accomplishing the result may be used. It is to be noted that the switch casing 409, may be removably mountable on a base 15, to permit adjusting the spring 401, and separation of the casing and base without disturbance of electric connections. A slot, neighboring said adjustable spring means, might be arranged in said casing 408, for insertion of an adjusting tool, therethru, to permit adjustment without separation of said base and casing.

Any type of indicator may be used such as an ordinary electric bulb 11, which may be arranged in the well known socket 111, which may be mounted in any suitable place by means of brackets 16, or the like.

The disclosure is intended to be illustrative rather than limitative.

I claim:

1. In combination with a thermostatic switch member having a base at one end and a contact at the other end, a gas chamber having a flexible end wall capable of distending to compensate for the change in volume of the gas in said chamber under varying conditions, an arm having one end permanently fastened to said flexible end wall and the other end removably engageable with said switch member base, whereby distension of said end wall under a rise of temperature of said gas actuates said switch member in one direction and in alignment with said arm, said switch member being mounted for lateral non-pivotal movement, yielding means resisting said movement, and means for varying the compression of said yielding means to vary the temperatures under which said switch will close under actuation of said end wall, a stop rest for said switch member to limit said resistance independent of said arm and end wall.

2. In combination with a thermostatic switch member having a base at one end and a contact at the other end, a gas chamber having a flexible end wall capable of distending to compensate for the change in volume of the gas in said chamber under varying conditions, an arm having one end permanently fastened to said flexible end wall and the other end removably engageable with said switch member base, whereby distension of said end wall under a rise of temperature of said gas actuates said switch member in one non-arcuate direction and in alignment and parallelism with said arm, said switch member being mounted for lateral non-pivotal movement the base thereof having at least two ends and having means for flexibly fastening it at each said end, yielding means resisting said movement, and means for varying the compression of said yielding means to vary the temperatures under which said switch will close under actuation of said end wall, said last-named means comprising nuts turnable on studs one of each at each end of said base.

3. In combination with a thermostatic switch member having a base at one end and a contact at the other end, a gas chamber having a flexible end wall capable of distending to compensate for the change in volume of the gas in said chamber under varying conditions, an arm having one end permanently fastened to said flexible end wall and the other end removably engageable with said switch member base, whereby distension of said end wall under a rise of temperature of said gas actuates said switch member in one non-arcuate direction and in alignment and parallelism with said arm, said switch member being mounted for lateral non-pivotal movement the base thereof having at least two ends and having means for flexibly fastening it at each said end, yielding means resisting said movement, and means for varying the compression of said yielding means to vary the temperatures under which said switch will close under actuation of said end wall, said last-named means comprising nuts turnable on studs one of each at each end of said base, a casing for said switch member having ports in the wall thereof for passage therethru of means to turn said nuts.

JACK GRACE.